J. R. PORTER.
CULTIVATOR BLADE.
APPLICATION FILED AUG. 28, 1915.
1,270,321.
Patented June 25, 1918.
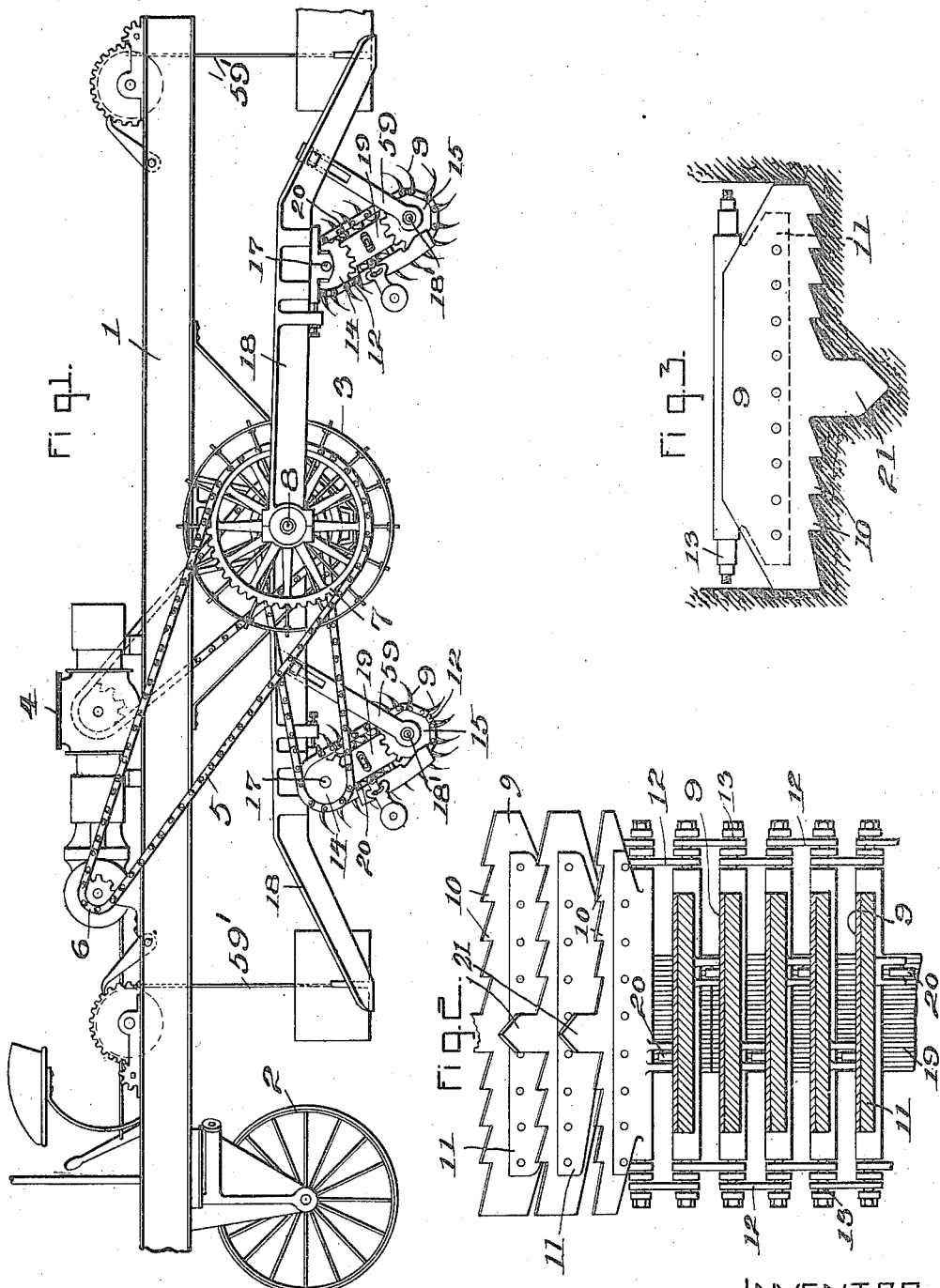
INVENTOR
Jesse R. Porter
BY Geyer & Popp
ATTORNEYS

UNITED STATES PATENT OFFICE.

JESSE R. PORTER, OF BUFFALO, NEW YORK, ASSIGNOR OF ONE-HALF TO EDWARD MICHAEL, OF BUFFALO, NEW YORK.

CULTIVATOR-BLADE.

1,270,321.  Specification of Letters Patent.  Patented June 25, 1918.

Original application filed July 22, 1912, Serial No. 710,743. Divided and this application filed August 28, 1915. Serial No. 47,750.

*To all whom it may concern:*

Be it known that I, JESSE R. PORTER, a citizen of the United States, residing at Buffalo, in the county of Erie and State of New York, have invented new and useful Improvements in Cultivator - Blades, of which the following is a specification.

This invention relates to a cultivator blade for digging and finely dividing or disintegrating the earth of a farm preparatory to planting seed in the same and more particularly to a machine for this purpose which is operated by power and designed to cover a comparatively large area during one run but which can also be operated by animal power and designed to cover a smaller area.

It is the object of this invention to produce a cultivator blade for this purpose which will thoroughly and effectually dig up the ground or earth and thoroughly pulverize or reduce the same suitable for planting, and which permits of digging up a portion of the sub-soil at the same time that the surface soil is being dug up.

This application is a division of an application filed by myself July 22, 1912, and serially numbered 710,743.

In the accompanying drawings:

Figure 1 is a side elevation of a cultivator provided with blades constructed in accordance with my invention. Fig. 2 is a fragmentary longitudinal section, on an enlarged scale, of a digger belt provided with a plurality of blades containing my invention. Fig. 3 is a fragmentary vertical transverse section showing one blade embodying my invention in the act of digging in the soil.

Similar characters of reference indicate corresponding parts throughout the several views.

My improved cultivator blade may be used on machines of various constructions but, as shown in the drawings the same forms part of a machine comprising a carriage having a main frame 1, wheels 2 and 3 supporting the front and rear parts of the frame, a motor 4 mounted on the frame, and a chain belt 5 passing around a driving sprocket wheel 6 on the engine shaft and a driven sprocket wheel 7 on the axle 8 of the rear wheels.

9 represents a plurality of blades, tools, bits, cutters or diggers which embody my invention and each of which is preferably constructed of sheet steel and curved so that upon engaging its outer or lower edge with the earth the concave side of the same faces toward the ground which is to be operated on or forwardly relatively to the direction of movement of the blade.

As shown in Figs. 2 and 3, each of these cutter or digger blades has its outer or operative edge serrated or toothed and each tooth having an inclined cutting edge whereby the several teeth enter the earth gradually with a shearing action which enables the same to be driven and effect the digging operation with less power than if the cutting edge of the digger were straight or continuous. Furthermore, by thus constructing the digger blade with a plurality of teeth or serrations the earth is not only dug up and loosened but the same is also disintegrated or pulverized so that the soil is properly tilled and suitable for planting without necessitating subsequent use of a harrow or similar implement for this purpose.

Each of these digging blades is mounted on the front side of a stock or supporting body 11 preferably constructed in the form of a horizontal bar which is arranged transversely in the machine. The several digger bars or stocks in each digger section are pivotally connected with one another so as to practically form an endless belt, chain or apron which is continuously rotated while the machine is in operation and moving over the ground so that the several digger blades are brought successively into engagement with the earth with a downward and rearward scooping action and the digging operation progresses as the machine advances. The preferred means for thus pivotally connecting the several digger bars or stocks which are shown in the drawings comprise a plurality of links 12 each of which is pivotally mounted at its opposite ends on reduced shanks 13 formed at the corresponding ends of two adjacent digger bars. Two series of such links are employed for connecting the opposite ends, respectively, of the several digger bars and the links of each series are staggered or off set alternately so as to permit each shank of a digger bar to receive the opposing ends of two connecting links, as shown in Fig. 2.

The endless digging implement thus formed by the blades, bars and links is rotated rapidly in a vertical plane by passing the upper end of this endless belt around upper or driving sprocket wheels 14 while the lower turn of this digger belt passes around lower supporting sprocket wheels 15. As shown in the drawings, two of such diggers are arranged under the front and rear parts of the main frame. The upper or driving sprocket wheels 14 of the digger belts are mounted on horizontal upper driven shafts 17 which are journaled in suitable bearings on vertically movable adjusting frames 18 which turn on the axle 8.

The lower sprocket wheels 15 supporting the lower turns of the digger belts are journaled on horizontal transverse shafts $18^1$ which latter are supported by means of adjusting hangers 59 connected with the adjusting frames 18. The upper and lower shafts 17, $18^1$ of each digger belt are connected by a link 19 and each blade stock is provided with a roller 20 which runs over the side of this link for guiding the respective digger belt. Motion may be transmitted from the motor 4 to the digger belts by any suitable means.

The blades of the belts pass downwardly and rearwardly around the lower sprocket wheels and dig up the soil and then idly pass upwardly and forwardly around the upper sprocket wheels, this operation continuing as the machine passes over the ground.

It is desirable, to dig up a part of the subsoil of the earth and mix the same with the surface soil during each plowing operation in order to gradually deepen the seed bed.

To accomplish this the cutter blade or digger is constructed, as shown in Fig. 3 with a central tooth 21 which is comparatively long and adapted to enter the sub-soil during the cultivating or plowing operation and a plurality of comparatively short teeth 10 arranged on opposite sides of the long tooth and adapted to engage only with the surface soil of the ground or earth which is being cultivated. By using this form of cutter blade or digger the cultivator when operating upon the earth will dig up a portion of the sub-soil owing to its greater penetration and lift the same so that it becomes mixed with the previously cultivated surface soil, thereby gradually increasing the depth of the soil which is suitable for planting.

Furthermore, by thus employing a subsoil tooth on each blade in addition to the surface soil teeth which have less penetration a drainage groove or channel is cut at intervals in the sub-soil below the stratum of surface soil which operates to drain the surplus moisture from the surface soil and maintain the same in the best condition for promoting the growth of the seed which has been planted in the same.

I claim as my invention:

A rotary earth working implement comprising a plurality of blades arranged in an endless series, each blade having a transverse row of teeth, the tooth in the central part of the row being comparatively long while the other teeth on opposite sides of the central part of the said row of teeth are shorter than said long tooth.

JESSE R. PORTER.

Copies of this patent may be obtained for five cents each, by addressing the "Commissioner of Patents, Washington, D. C."